United States Patent [19]
Larsson et al.

[11] 3,818,172
[45] June 18, 1974

[54] WELDING APPARATUS FOR INTERCONNECTING FLANGES

[75] Inventors: Sven Sigvard Larsson; Lennart Bertil Vilhelm Brange, both of Malmo, Sweden

[73] Assignee: Kockums Mekaniska Verkstads AB, Malmo, Sweden

[22] Filed: Sept. 7, 1972

[21] Appl. No.: 287,207

Related U.S. Application Data

[63] Continuation-in-part of Ser. No. 90,337, Nov. 17, 1970, abandoned.

[52] U.S. Cl.................................. 219/82, 219/101
[51] Int. Cl........................................... B23k 11/06
[58] Field of Search........... 219/81, 82, 83, 84, 161, 219/125 R, 101, 102, 104, 107, 59, 64, 67

[56] References Cited
UNITED STATES PATENTS
1,637,031   7/1927   Tobey.................................. 219/81
2,892,921   6/1959   Mecklenborg...................... 219/81
3,045,106   7/1962   Ballard............................ 219/125 R
3,167,636   1/1965   Bosteels.......................... 219/125 R
3,264,446   8/1966   Gronlund............................. 219/82

*Primary Examiner*—C. L. Albritton
*Attorney, Agent, or Firm*—Jones and Lockwood

[57] ABSTRACT

An electric welding apparatus for interconnecting abutting flanges formed by metal sheets comprises a platform arranged as a unit which is separate from an associated welding transformer. On the platform there are arranged clamping rollers for electrical welding and for driving engagement with the flanges as well as driving means operatively connected with the clamping rollers for propelling the platform along the flanges. The platform is supported by supporting members which are adjustable with respect to the platform enabling the position of the clamping members to be adjusted with respect to a transverse and a longitudinal axis of the platform.

11 Claims, 10 Drawing Figures

PATENTED JUN 18 1974 3,818,172

WELDING APPARATUS FOR INTERCONNECTING FLANGES

The present invention relates to a welding apparatus and is a continuation-in-part of U.S. Pat. application Ser. No. 90,337 filed Nov. 17, 1970, now abandoned.

More particularly the invention relates to a welding apparatus for welding together at least two sheet metal flanges abutting each other, of which at least one is fixedly united with an anchoring means disposed behind it.

The welding apparatus according to the invention is of the kind comprising a platform movable along the flanges and having clamping means which may be placed against opposite sides of the flanges spaced in the intended direction of movement of the platform along the flanges, said clamping means comprising clamping rollers for electrical seam or spot welding and for operational engagement with the flanges for propelling the platform along these, and supporting members such as rollers on the platform which are adapted to rest against the metal sheets on both sides of the flanges.

Welding apparatuses of this type are used for welding together sheet-metal panel structures consisting of a number of metal sheets which are interconnected at vertical marginal flanges, the platform being moved along such flanges accordingly as the flanges are welded. A great many different welding apparatuses of the type indicated above have already been proposed for this purpose. For some of these prior-art welding apparatuses special guide rails or other guiding means must be mounted in order to support and guide a carriage which in turn carries the welding means, in which case the supporting means may be of such a kind that the welding means has a limited mobility in relation to the carriage in order to take up minor deviations in the positional relation between the guiding means and the welding means. These welding apparatuses are for the most part heavy units which are difficult to handle and require extensive mounting work before they can be put to use, which entails considerable drawbacks for instance when welding tanks in vessels. In other prior-art welding apparatuses the platform runs or slides on the metal sheets or on the margin of the marginal flanges and is guided thereby, whereby the necessity of mounting special guiding means is avoided. However, certain prior-art welding apparatuses of this kind require that the flanges are carefully trimmed and that the sheets are held well pressed against a support or backing with the flanges held in the proper position in relation to each other, and in certain cases, are designed in such a way that they can operate only if they stand on supporting horizontal surfaces; they are inoperative in a hanging position or on vertical surfaces.

With the welding of specially thin metal sheet structures for tanks in gas transportation vessels none of the prior-art welding apparatuses have proved to meet all the demands which are placed on the apparatus for such welding. The panel structure of thin sheet metal is made from a number of metal sheets having marginal flanges which are directed towards the interior of the tank and are to be welded together with a shim consisting of a sheet-metal strip for anchoring the flanges and consequently the sheet metal structure to the body frame of the gas tank structure. In such cases it may however occur that the metal sheet flanges located on both sides of the sheet-metal strip do not occupy the right position in relation to the sheet-metal strip but protrude from the sheet-metal strip as a result of bending or bulging of the panel. When using the prior-art welding apparatuses it is therefore necessary, prior to carrying out the welding, to straighten the panels adjacent the flanges to be welded together in order to create the correct relative position between the sheet-metal strip and the flanges, and as a rule it is necessary in such a case to fix the sheet metal strip and the flanges in relation to each other by spot welds.

The invention aims at overcoming the drawbacks described above and to provide a welding apparatus which is well suited for welding standing marginal flanges on both horizontal and vertical surfaces in a hanging or a standing position, and is especially well suited for welding thin sheet-metal panel structures for gas tanks in gas transportation vessels.

For this purpose there is provided according to the invention a welding apparatus of the kind referred to comprising a platform arranged as a unit separate from an associated welding transformer and movable along the flanges, supporting members on said platform supporting the platform during the movement thereof which are mutually spaced transversely of the moving direction of the platform to rest against metal sheets forming said flanges, on both sides of the flanges, clamping means on said platform, which are engageable with opposite sides of the flanges spaced in the intended direction of movement of the platform along the flanges, said clamping means including clamping rollers for electrical welding and for driving engagement with the flanges, driving means operatively connected with said clamping rollers for propelling said platform along the flanges, and means for adjusting the position of the clamping rollers with respect to a transverse and a longitudinal axis of the platform in order to provide a force against the metal sheets on both sides of the flanges, provided by the engagement of the clamping rollers with the flanges and transmitted to the metal sheets through said supporting members.

Embodiments of the welding apparatus according to the invention will be described in greater detail in the following with reference to the accompanying drawings, in which FIG. 1 is a side view of the welding apparatus in one embodiment thereof;

Figure 3:
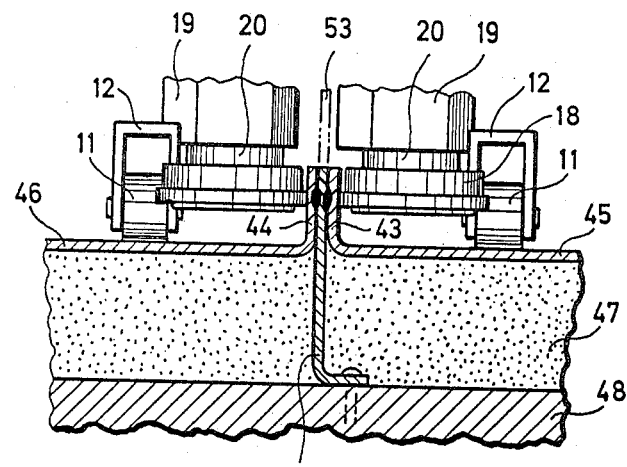
FIG. 3 is a partial end view of the welding apparatus in FIGS. 1 and 2 in a position of operation on standing marginal flanges.
Figure 4:
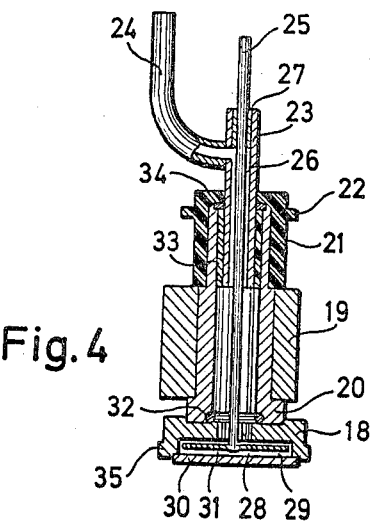
FIG. 4 is an axial sectional view through one of the electrode rollers and its bearing means.
Figure 5:
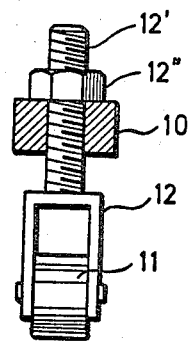
FIG. 5 is an axial sectional view of the mounting means of a supporting roller.

The welding apparatus in FIGS. 1-5 has a platform 10 which is constructed as a frame and is provided with four support rollers 11 journalled in forks 12 each of which may be connected to the platform 10 by means of a screw to be adjustable vertically in relation to the platform. As shown in FIG. 5 such screw 12' may be fixed to the associated fork 12 and may be screwed into threaded bores in platform 10. A nut 12 inches on the screw may be tightened against the platform to lock the screw in the adjusted position. Such screw means are known per se. The platform carries a drive motor 13, electric or pneumatic, the motor being attached to a transverse web 14 in platform 10. On the platform there are rotatably mounted two clamping rollers 15A, one of which is mounted on a slide 16A, which may be displaced manually on the platform by means of a screw device 17A for displacing said clamping roller in relation to the other, it being possible to provide a spring load in the screw device or in the bearing means of either clamping roller in order that the two clamping rollers may yield resiliently when they are pressed against each other. Spaced from clamping rollers 15A in the longitudinal direction of the welding apparatus there are provided two additional clamping rollers 15B, both of which are mounted each on a slide 16B which is manually displaceable on the platform by means of a screw device 17B in the same manner as slide 16A, each screw device 17A comprising a spring load.

Spaced from clamping rollers 15B in the longitudinal direction of the welding apparatus at the side opposite to clamping rollers 15A there are provided two electrode rollers 18 for electric seam welding. According to FIG. 4, each of these electrode rollers is rotatably mounted in a bearing member 19 by means of a hollow shaft 20 non-rotatably connected with the roller, the lower end of said hollow shaft being received in a recess in the electrode roller and the upper end of which is provided with a hood 21 non-rotatably mounted on the shaft and having a sprocket ring 22. The hood and the sprocket ring are made of electrically insulating material, preferably polytetrafluorethylene. Through shaft 20 and hood 21 there passes a tube 23 terminating approximately halfway inside shaft 20 and projecting at the top from hood 21 in order to be provided there with a branch tube 24. An additional tube 25 extends through tube 23 with an interspace 26 provided between the two tubes, said space being closed at the top by means of a bushing 27 with pipe 25 projecting from pipe 23 at the upper end thereof through bushing 27. Interspace 26 is in communication through shaft 20 and an axial passage 28 in electrode roller 18 with a cavity 29 provided in the electrode roller, said cavity consisting of an axial recess in the electrode roller which is closed by means of a washer 30 welded or screwed thereto. Tube 25 extends downwardly into said cavity and terminates at a distance from washer 30. At the end of tube 25 which projects into the cavity there is provided a spider 31 having a number of inclined vanes. The bore of shaft 20 is sealed below by means of an O-ring 32 which is disposed between shaft 20 and electrode roller 18. At the top, the bore in the shaft is sealed on one hand by means of a bushing 33, preferably of polytetrafluorethylene, which also serves as a sleeve bearing between the rotatable hollow shaft 20 and the stationary tube 23 and as an electric insulation between these two elements, and on the other hand by means of a sealing sleeve 34, which is provided between shaft 20 and tube 23. The described arrangement is intended for cooling electrode roller 18 and hollow shaft 20 and consequently bearing 19, a coolant (liquid or air) being supplied through tube 25 to cavity 29 in order to be brought into turbulence there by means of spider 31 and then to return through interspace 26 and branch tube 24. The electrode surface proper on electrode roller 18 is formed by an outward annular flange 35 which may be replaceably mounted on the electrode roller.

The bearing means for each electrode roller 18 is stationarily connected with a mounting members 36A and 36B, respectively, but is electrically insulated from said mounting member. One mounting member 36A is stationarily connected with the platform by means of a flange 37 welded thereto, while the other mounting member 36B is connected with the mounting member 36A, which is thus fixed in relation to the platform, in a joint 38 permitting mounting member 36B to be swung towards and away from mounting member 36A. From each bearing member 19 there projects an electrically insulated lug 39. Through said lugs there passes a manually adjustable screw means 40 for displacing the two electrode rollers in relation to each other, spring means 41 being part of the screw means, in order that the electrode rollers may yield resiliently when they are pressed against each other. Sprocket rings 22 on hoods 21, each connected with one of electrode rollers 18, are operably connected by means of a chain 42 to a driving sprocket on motor 13 for rotating the two electrode rollers 18 in opposite directions. Drive chains 42 may in that case be guided by means not shown in detail in order to be kept tensioned irrespective of which position the adjustable mounting member 36B occupies.

A transformer arranged as a separate movable or otherwise transportable unit for supplying welding current to the two electrode rollers may be connected to bearing members 19 by means of flexible, preferably liquid or air cooled conduits of varying length. These conduits may consist of a number of stranded wires disposed in a hose leading the coolant which flows around and cools the individual strands. As a result of the efficient cooling of the parts which rotate in relation to each other in the bearing members of each electrode roller and which is obtained through the cooling arrangement described in connection with FIG. 4, it is achieved that very narrow tolerances and consequently a good current transfer between each bearing member 19 and the associated shaft 20 are obtained. On platform 10 there may be disposed a scraper electrically insulated from the platform for each electrode roller 18, said scraper resting against annular flange 35 in order to keep it clean during the rotation of the electrode roller.

When using the welding apparatus described — see FIG. 3 — for welding together marginal flanges 43 and 44 on metal sheets 45 and 46, respectively, forming an inner sheet-metal panel structure for instance in a tank having insulation 47 disposed between the metal sheets and a body frame 48 and with a sheet-metal strip 49 which is secured to the frame 48 located between the two flanges 43 and 44, the platform is mounted straddling the standing flanges and the intermediate sheet-metal strip, with clamping rollers 15A and 15B and electrode rollers 18 set against opposite sides of the flanges, as shown in FIG. 3 with respect to electrode rollers 18. Due to the fact that clamping rollers 15B are both adjustable, the nip between them may be adjusted laterally in relation to a straight line between clamping rollers 15A and electrode rollers 18 in order to compensate for possible deviations in the linearity of the flanges. In that case supporting rollers 11 rest against metal sheets 45 and 46 and by adjusting the level of the said supporting rollers in relation to platform 10 the attitude of the platform with respect to a transverse axis is controlled to impart to the platform an inclined position such that the welding apparatus, when the electrode rollers are rotated and the welding apparatus consequently moves along the flanges, is pressed against the two metal sheets. It is of course possible to provide the required attitude of the clamping rollers and the electrode rollers with respect to a transverse axis by placing the rotational axes of the latter obliquely in relation to the platform instead of providing the oblique position by inclining the platform.

Figure 1:
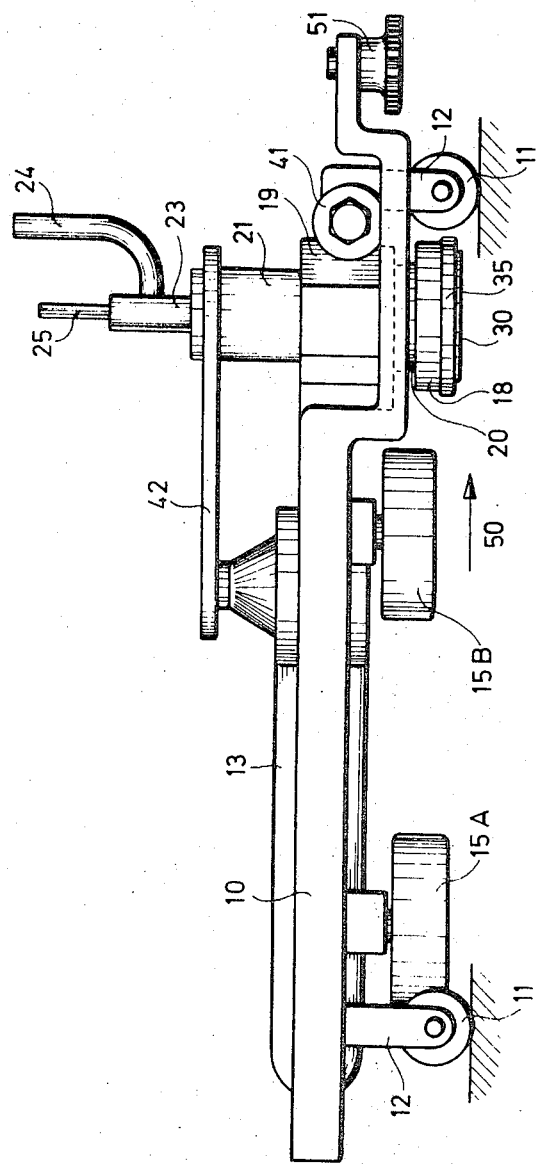
Figure 2:
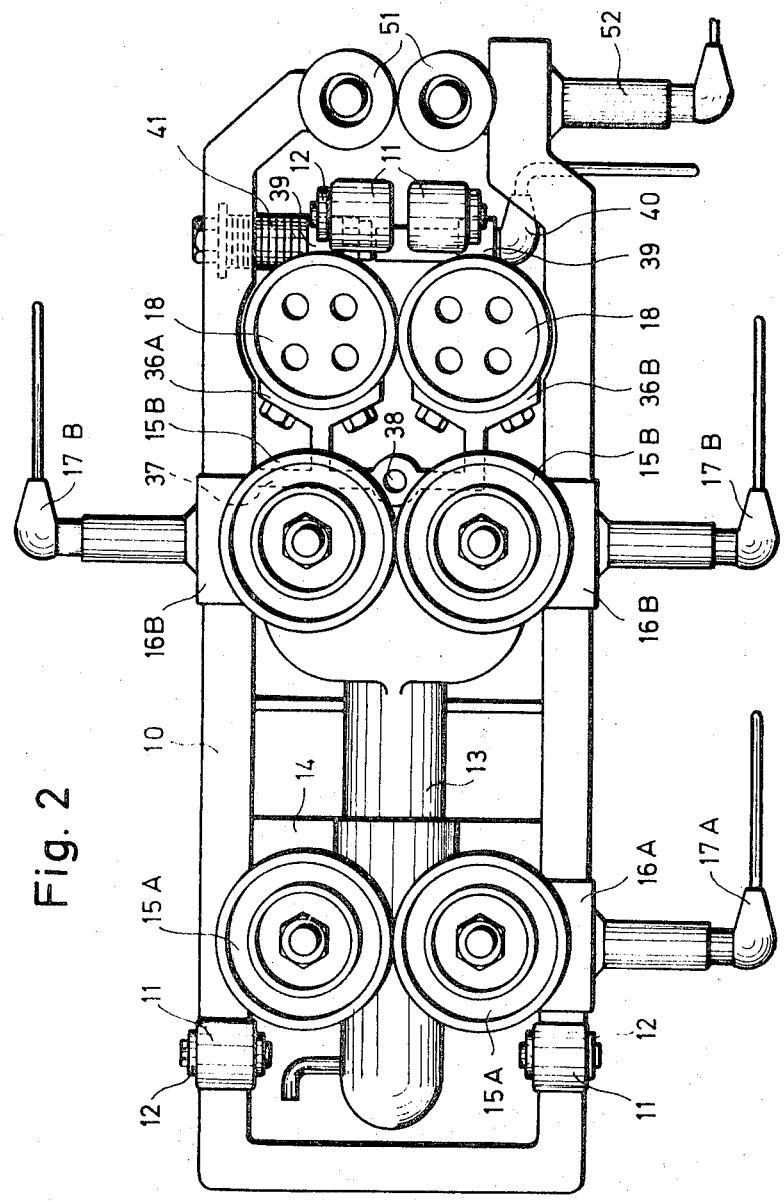
FIG. 2 is a bottom plan view of the welding apparatus in FIG. 1.

The platform is meant to move in the direction of the arrow 50 in FIG. 1 and in that case the platform is given a downward inclination in a direction from the left towards the right in FIG. 1. When welding current is supplied to electrode rollers 18 during the movement of the platform flanges 43 and 44 and intermediate sheet-metal strip 49 are seam welded in the correct position due to the fact that the supporting rollers as a result of the inclination of the clamping rollers and the electrode rollers are pressed against metal sheets 45 and 46 which are consequently pressed against the structure disposed behind it, whereby flanges 43 and 44 are kept in the correct position in relation to sheet-metal strip 49 during the welding by means of the front pair of support rollers 11, which are located adjacent electrode rollers 18 with respect to the longitudinal direction of the platform and adjacent the longitudinal central plane of the platform, i.e, immediately adjacent the flanges on both sides thereof. The rear supporting rollers 11 are however disposed at a greater relative distance in order to stabilize the platform about its longitudinal axis allowing for adjustment of the attitude of the platform as well as the clamping rollers and the electrode rollers about the longitudinal axis of the platform. During the welding the two electrode rollers and their shafts and bearings are continuously cooled by circulation of coolant in the electrode rollers, which is important in order that a good seam may be obtained.

At the front end of the platform with respect to the direction of movement there are rotatably mounted two clamping rollers 51 having a knurled mantle surface, of which at least one is disposed on a slide adjustable by means of a screw device 52. This screw device may comprise a spring load in a manner indicated previously.

These clamping rollers are adapted to engage a portion of sheet-metal strip 49 protruding from flanges 43 and 44 — the said portion is shown by dot and dash lines 53 in FIG. 3 — the said rollers being inclined in such a direction that when the platform moves along the flanges they will exert a traction on sheet-metal strip 49 in an outward direction away from body frame 48. This traction is necessary in certain tank panel structures in order to ensure an anchoring of the sheet-metal strip to the body frame which is free from backlash.

The welding apparatus operates equally well standing on or depending from horizontal surfaces and on vertical surfaces, as it is retained on the flanges by the clamping action exerted by the clamping rollers and the electrode rollers, and is permanently pressed against the metal sheets forming the flanges. By suitable adjustment of the position of the supporting rollers 11 in relation to platform 10 an attitude of the platform about a transverse axis suitable for the pressing operation is obtained. Of course, the supporting rollers also determine the attitude of the platform about a longitudinal axis, which is essential in connection with the welding of horizontal flanges on a vertical wall. It is not necessary that two flanges 43 and 44 be welded together with a sheet-metal strip 49, which is to be regarded as a stationarily anchored flange. It is also possible to weld together either of flanges 43 and 44 with sheet-metal strip 49, or to weld together flanges 43 and 44 directly, either metal sheet 45 or metal sheet 46 being anchored adjacent the flange located thereon, for instance by nailing or in another manner.

The welding apparatus disclosed in FIGS. 6–10 comprises a platform which includes two side frames 60 and 61, respectively, which are rigidly interconnected by cross bars 62. Each frame is provided with two forks 63 which are connected directly to frame 61 and indirectly to frame 60 by means of brackets 64 mounted to frame 60 by bolts 65. In each fork 63 there is rotatably mounted a roller for supporting the platform and such roller is formed as a sleeve 66, e.g., of Nylon surrounding a cylindrical bearing block 67. The sleeve is rotatable and axially displaceable on the bearing block which is eccentrically mounted on a shaft 68. This is mounted for rotational and axial movement in the associated fork 63. Bearing block 67 is non-rotatably connected with shaft 68 by two transverse pins 69. Shaft 68 may be rotated by means of a wrench or other tool engaging and end portion 70 of the shaft, having a square cross sectional form. By rotating the shaft it is possible to adjust the vertical position of roller 66 in relation to fork 63. For locking shaft 68 in the adjusted rotational position there is provided on a threaded portion of the shaft inwardly of portion 70 a nut 71 which may be tightened against an annular force transmitting member 72 on the shaft. This member is non-rotatably mounted on the shaft by a pin 73 extending through an elongate slot 74 in shaft 68, the eccentric bearing 67 being pressed against fork 63 at 75 when nut 71 is being tightened. Thus, it will be seen that shaft 68 and bearing 67 are fixedly clamped to fork 63 in the adjusted position but may be loosened again when it it desired to change the vertical position of the roller in relation to the fork for adjusting the attitude of the platform for the purposes described with reference to the embodiment disclosed in FIGS. 1–5 in the drawings.

In the platform there are rotatably mounted two pairs of clamping rollers 76A, 76B and 77A, 77B at opposite ends of the platform as well as a pair of electrode rollers 78A, 78B. Rollers 76A, 76B and 77A, 77B are made of Nylon or other electrically insulating material; they may be made of metal, at least one roller of each pair being electrically insulated by a suitable bearing. Rollers 76A and 77A are rotatably mounted each on one of brackets 64, and roller 78A is rotatably mounted on frame 60. The respective associated rollers 76B, 77B, and 78B are mounted on a carriage 79 which is supported by guide cross bars 62 for movement along said cross bars transversely of the longitudinal direction of the platform. For this purpose there are provided on the carriage sockets 80 having an inner lining 81 of an electrically insulating material such as Nylon and closed at the opposite ends by annular disks 82 also of an electrically insulating material. Coiled pressure springs 83 surrounding cross bars 62 are engaged between end enlargements 84 on the cross bars and adjacent disks 82 on carriage 79 to bias the carriage in such direction that the rollers carried thereby are moved away from their respective associated rollers. On the side of the carriage remote from springs 83 there is mounted by means of bolts 85 a plate 86 of electrically insulating material having a forked portion 86'. In this portion there is mounted by means of a pin 87 a piston rod 88 integrally connected with a piston 89 which is reciprocable in a cylinder 90 mounted to frame 61 and having a connection 91 for a conduit supplying and venting pressurized air to and from, respectively, the chamber defined by cylinder 90 and piston 89 at the side of the piston which is opposite to piston rod 88. The chamber formed on the piston rod side of the piston is vented to the atmosphere by a through passage 92 in frame 61.

The rollers in the several pairs are pressed towards each other by means of air pressure in cylinder 90 supplied through connection 91 against the bias afforded by springs 83. When such pressure is relieved the rollers are separated under the bias of springs 83.

It will be seen that carriage 79 is electrically insulated from the frame and the members associated therewith, and the reason for this is that electrode rollers 78A and 78B have to be connected with opposite poles of the welding current supply system.

Figure 9:
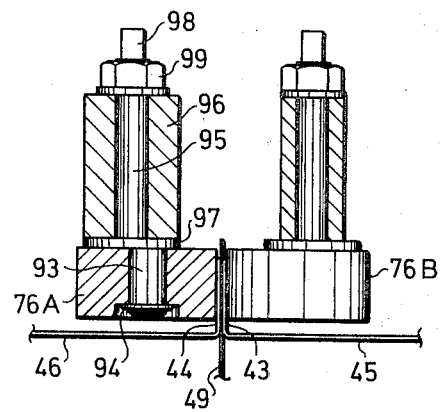
FIG. 9 is a cross-sectional view along line IX — IX in FIG. 7.
Figure 10:
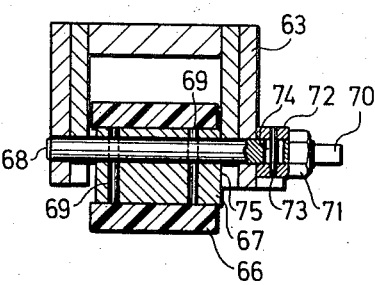
FIG. 10 is a cross-sectional view along line X — X in FIG. 7.

Each of rollers 76A, 76B and 77A, 77B is mounted as disclosed in FIG. 9 in order to enable the clamping action between these rollers to be adjusted individually in each pair of rollers independently of the clamping action obtained between electrode rollers 78A, 78B under the force provided by piston 89 due to air pressure in cylinder 90. Each roller is rotatably mounted on a crank pin 93 and is retained thereon by a locking washer 94. The crank pin forms part of a crank 95 rotatably mounted in a bearing 96 forming part of or supported by bracket 64 and carriage 79, respectively, a crank disk 97 integrally connecting pin 93 eccentrically to crank shaft 95 being disposed between bearing 96 and the associated roller. The crank shaft is formed at the upper end thereof with a portion 98 having square cross sectional form to be engaged by a wrench or the like, and on a threaded portion of the crank shaft there is provided a nut 99 by means of which the crank shaft may be fixedly clamped in an adjusted rotational position. Thus, it will be seen that each of rollers 76A, 76B, 77A, and 77B is individually adjustable in order to provide between the clamping rollers the desired pressure when the electrode rollers 78A, 78B are pressed together under the pressure required for successful seam welding or spot welding.

Supported by the platform on frame 60 thereof is an electric drive motor 100 having a gear case 101 connected therewith. The output shaft 102 of the gear case is connected with a gear wheel 103 of an electrically insulating material such as Nylon by a pin 104, gear wheel 103 being rotatably journalled in a housing 105. This gear wheel engages a further gear wheel 106 of an electrically insulating material, which in turn engages a further gear wheel 107 of an electrically insulating material. Gear wheel 106 and 107 are also rotatably journalled in housing 105 and have the same diameter. Thus, they are rotated at the same rpm in opposite directions from gear wheel 103.

Figure 6:
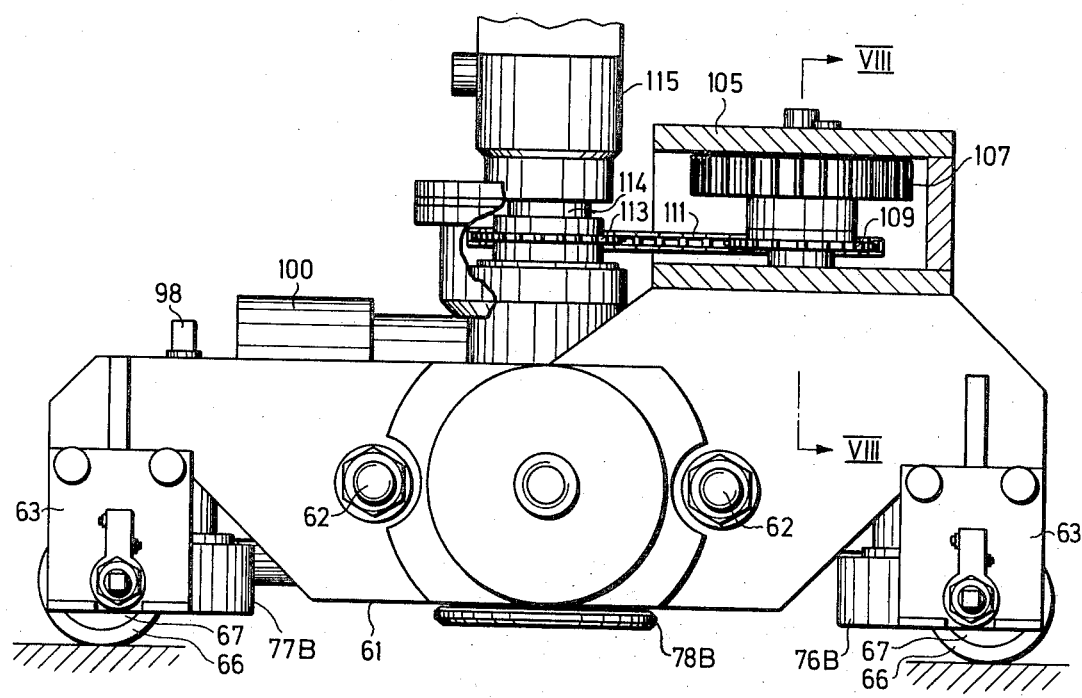
FIG. 6 is a side view of the welding apparatus in another embodiment thereof, partly in cross-section.
Figure 7:
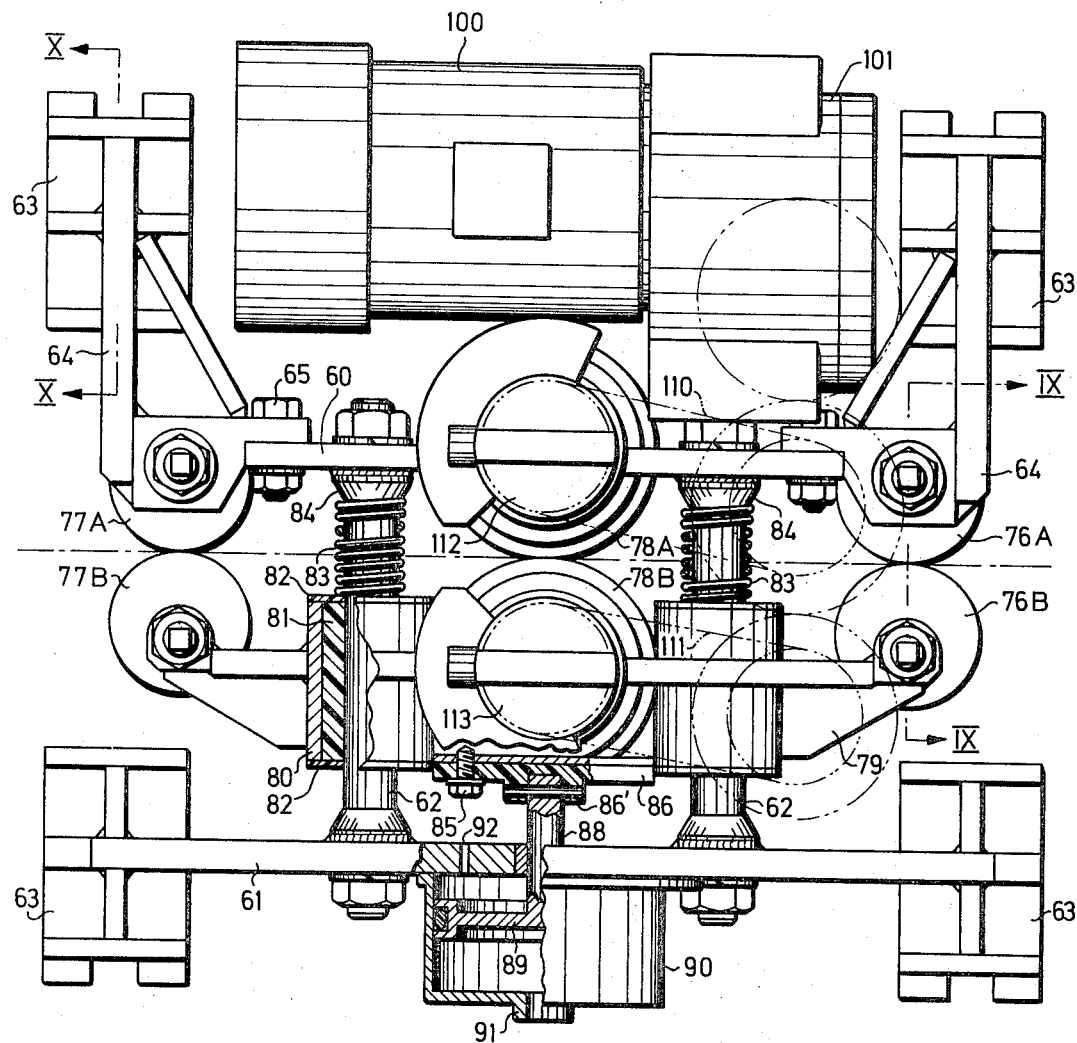
FIG. 7 is a top plan view of the welding apparatus in FIG. 6, partly in cross section.
Figure 8:
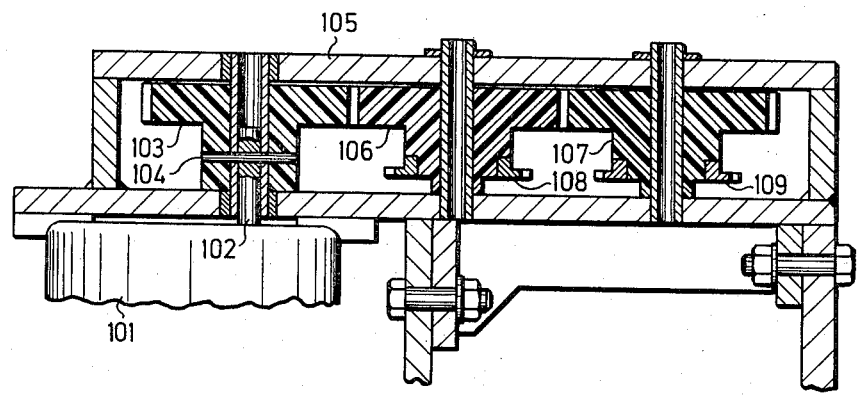
FIG. 8 is a cross-sectional view along line VIII — VIII in FIG. 6.

To each of gear wheels 106 and 107 there is mounted a sprocket ring 108 and 109, respectively, and these sprocket rings are drivingly connected by chains 110 and 111, respectively, with sprockets 112 and 113, respectively, on the shafts of electrode rollers 78A, 78B one of said shafts being shown in FIG. 6 at 114. Thus, the electrode rollers may be rotated for driving the mobile platform along the flanges to be welded in the manner described with reference to the embodiment according to FIGS. 1–5.

The shaft of each electrode roller is provided with a connector such as shown at 115 on shaft 114 in FIG. 6 for the connection of the heavy supply cables from the welding transformer. Due to the insulation of carriage 79 by lining 81, plates 82 and 86, rollers 76B and 77B and gear wheels 106 and 107 from the rest of the platform there is one passage for the welding current, i.e., through the electrode rollers and the flanges clamped therebetween.

Electrode rollers and the shafts thereof have to be cooled by a coolant circulated through these elements and such cooling may be arranged as disclosed in FIG. 4 or in another way. For example the coolant may be supplied through a side inlet of the shaft and may be circulated downwardly through the shaft to the roller, from the roller axially through the shaft to the top thereof and then axially back through the shaft to a side outlet.

It will be seen that the platform described with reference to FIGS. 6–10 may be adjusted as far as the attitude thereof is concerned for the purpose described by adjusting individually the rotational position of the four excentric bearings 67 in order to adjust the roller 66 thereon vertically in relation to the platform.

The invention is clearly not restricted to the embodiments shown but may be varied within the scope of the appended claims. The welding apparatus may also be used for electrical spot welding by pulsing the current through the electrode rollers.

What we claim is:

1. A welding apparatus for interconnecting at least two sheet-metal flanges abutting each other, of which at least one is fixedly united with an anchoring means disposed behind it, comprising a platform arranged as a unit separate from an associated welding transformer and movable along the flanges, supporting members on said platform for supporting the platform and allowing the movement thereof which members are mutually spaced transversely of the moving direction of the platform to rest against metal sheets forming said flanges, on both sides of the flanges, clamping means on said platform, which are engageable with opposite sides of the flanges and are spaced in the intended direction of movement of the platform along the flanges, said clamping means including clamping rollers for electrical contact and driving engagement with the flanges, driving means operatively connected with said clamping rollers for propelling said platform along the flanges, and means for adjusting the attitude of the clamping rollers with respect to a transverse and a longitudinal axis of the platform in order to provide a force against the metal sheets on both sides of the flanges by the engagement of the clamping rollers with the flanges, such force being transmitted to the metal sheets through said supporting members.

2. A welding apparatus as claimed in claim 1 wherein a pair of electrode rollers form the driving rollers of said platform and are connected to the driving means to be driven synchronously.

3. A welding apparatus as claimed in claim 2, having two pairs of supporting members, said pairs being mutually spaced in the intended direction of movement of the platform wherein the supporting members in one pair are located adjacent the electrode rollers in front thereof in the intended direction of movement of the platform extending towards each other beyond the centres of the electrode rollers in order to rest against the metal sheets adjacent the flanges.

4. A welding apparatus as claimed in claim 2, comprising means mounting the electrode rollers for engagement with the flanges to be relatively swingable about a transverse axis of a plane determined by the contact points of said supporting members on the metal sheets.

5. A welding apparatus as claimed in claim 1, wherein the supporting members each comprise a roller, a bearing rotatably mounting the roller, means rotatably mounting the bearing for eccentric rotational movement, and means for locking the bearing in an adjusted eccentric position.

6. A welding apparatus as claimed in claim 1 comprising means for stationarily mounting one of a pair of clamping rollers and adjustably mounting the other one to be movable towards and away from the stationary clamping roller.

7. A welding apparatus as claimed in claim 6 further comprising a carriage rotatably mounting said one roller, means mounting said carriage for linear movement in the transverse direction of the platform, and means for biassing the carriage to engage said one roller with the associated roller of the pair of clamping rollers.

8. A welding apparatus as claimed in claim 7 wherein the carriage is electrically insulated from the rest of the platform.

9. A welding apparatus as claimed in claim 6 comprising rotational crank means pivotally mounting said one roller for adjustment towards and away from the stationary clamping roller, and means for locking the crank means in an adjusted rotational position.

10. A welding apparatus as claimed in claim 1 wherein one pair of the clamping rollers are disposed on a higher level than at least one other pair of the clamping rollers for engagement with a sheet-metal flange protruding from another sheet-metal flange, and wherein said one pair of clamping rollers are inclined in order to exert an outwardly directed traction force on said protruding sheet-metal flange.

11. A resistance welding apparatus for interconnecting at least two sheet-metal flanges abutting each other, of which at least one is fixedly united with an anchoring means disposed behind it, comprising:

a platform arranged as a unit separate from an associated welding transformer and movable along the flanges;

clamping rollers on the platform which are engageable with opposite sides of the flanges and are spaced in the intended direction of movement of the platform along the flanges, said clamping rollers being arranged as electrode rollers for electric seam or spot welding and as drive rollers for propelling the platform along the flanges;

supporting members on the platform for supporting the platform and allowing the movement thereof, said members being mutually spaced transversely of the moving direction of the platform to rest against metal sheets forming said flanges, on both sides of the flanges; and means for setting the attitude of the clamping rollers about a longitudinal axis of the platform and an axis extending transversely of the longitudinal axis substantially in parallel with a plane determined by the contact points of said supporting members on the metal sheets, in order to provide a force against the metal sheets on both sides of the flanges due to the engagement of the clamping rollers with the flanges, said force being transmitted to the metal sheets by the supporting members.

* * * * *